July 13, 1954   S. A. PETERSON   2,683,438
MULTIPLE HEN NEST
Filed Sept. 26, 1951   2 Sheets-Sheet 1
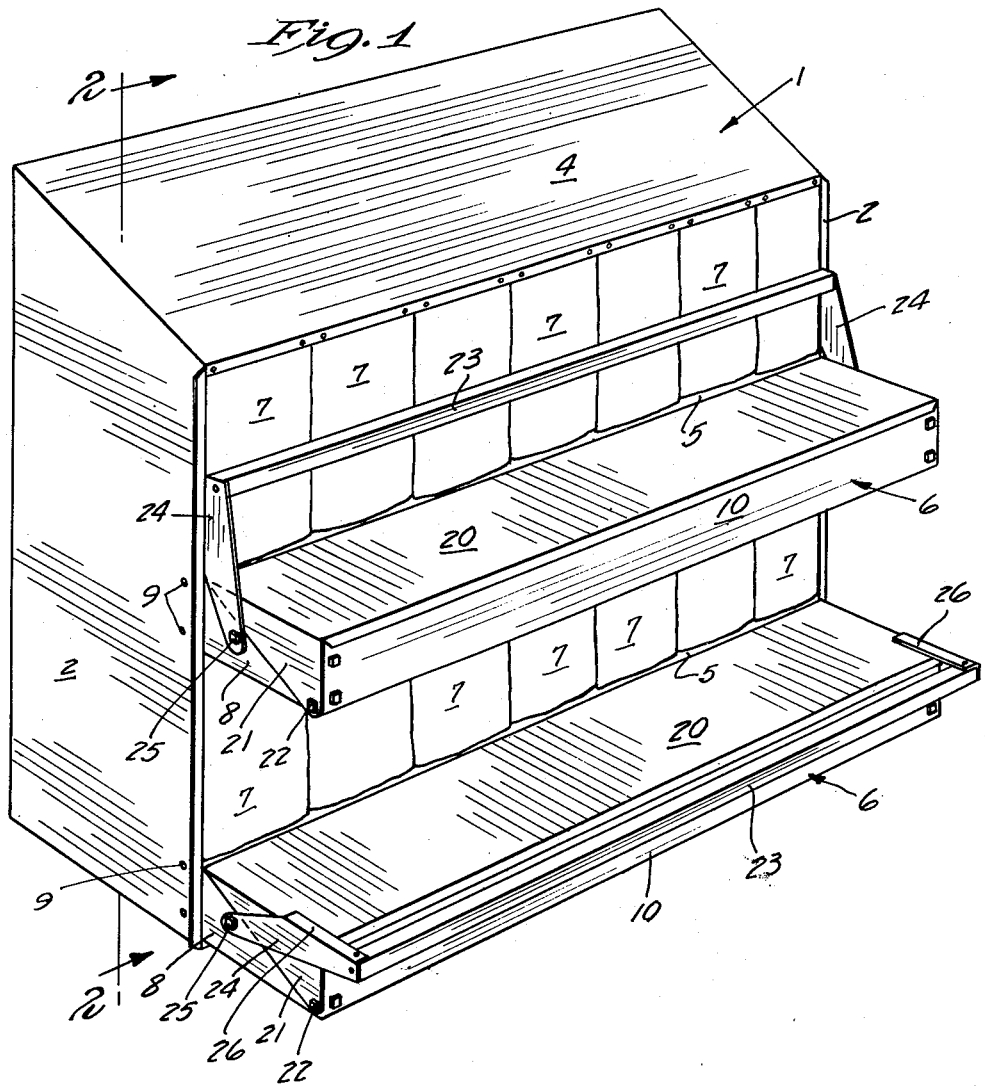
INVENTOR.
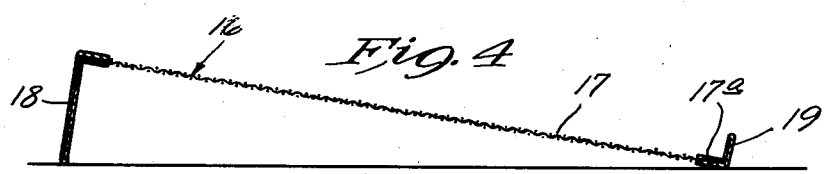
Seymour A. Peterson
BY
Merchant & Merchant
ATTORNEYS July 13, 1954
S. A. PETERSON
2,683,438
MULTIPLE HEN NEST
Filed Sept. 26, 1951
2 Sheets-Sheet 2
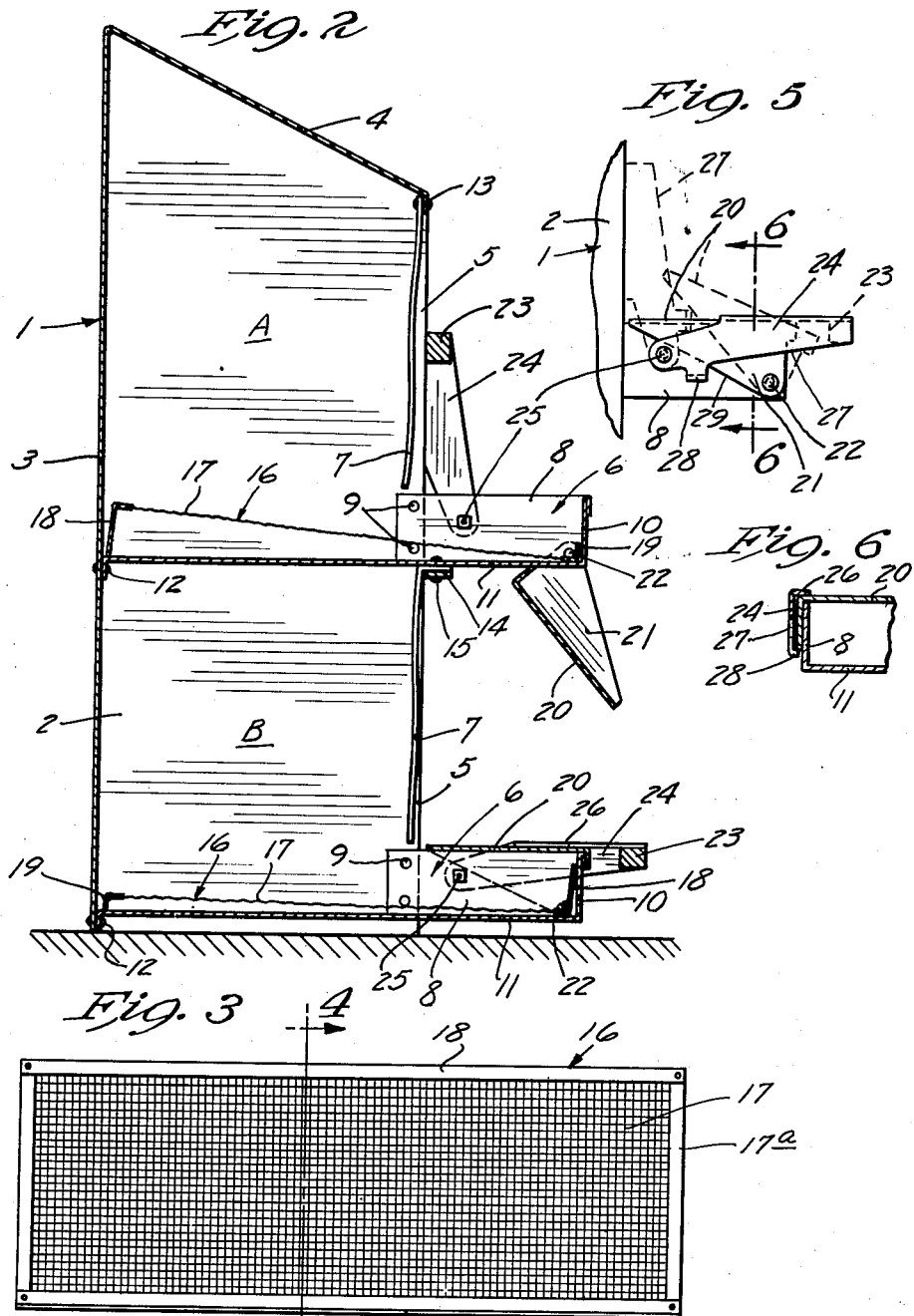
INVENTOR.
Seymour A. Peterson
BY
Merchant & Merchant
ATTORNEYS Patented July 13, 1954

2,683,438

UNITED STATES PATENT OFFICE 2,683,438

MULTIPLE HEN NEST

Seymour A. Peterson, Dassel, Minn., assignor to Storm Industries, Inc., Dassel, Minn., a corporation of Minnesota Application September 26, 1951, Serial No. 248,335

2 Claims. (Cl. 119—48)

My invention relates to multiple egg nests and has for its primary object the provision of an egg-collecting tray in combination with a novel perch-forming member which facilitates access of egg-laying hens to the nest.

A still further object of my invention is the provision of a perch-forming member of the class above-described, which may be swung upwardly and rearwardly from a position adjacent the front wall of the egg-collecting tray to a barrier-forming position transversely of the open front of the nest, whereby to prevent undesirable roosting of the hens during the night—as well as to lock the birds in the nest when the eggs are being collected from the egg-collecting tray, whereby to prevent their running over the eggs during such collection.

A still further object of my invention is the provision of a novel combination perch-barrier and cover element for the egg-collecting tray, whereby movements of the perch from its perch-forming position to its barrier-forming position will partially open the cover so as to clearly demonstrate to the operator the direction of opening movements of the cover and, therefore, prevent his buckling of the cover by attempting to lift upwardly upon the wrong edge thereof.

A still further object of my invention is the provision of a combination cover for the egg-collecting tray and perch-barrier forming member in which the top-forming element, when elevated to its partially open position by said perch-barrier forming member, will tend to retain said perch-barrier member in its barrier-forming position against opening positions by the hens—during the night or when it is desirable to keep the hens from the nest.

A still further and highly important object of my invention is the provision of a novel nest of the class above-described, which is relatively light in weight, durable and inexpensive in construction, and easy to operate.

The above and still further objects and advantages of my invention will become apparent from the following detailed specification, appended claims, and attached drawings.

Referring to the drawings, wherein like characters indicate like parts throughout the several views:

Fig. 1 is a view in perspective of my novel structure;

Fig. 2 is a view in vertical section taken on the line 2—2 of Fig. 1, the position of some of the parts being changed;

Fig. 3 is a top plan view of the screen utilized in my novel structure;

Fig. 4 is an enlarged view in transverse section taken on the line 4—4 of Fig. 3;

Fig. 5 is a fragmentary view of the modified form of my construction; and

Fig. 6 is a view in section, taken substantially on the line 6—6 of Fig. 5.

Referring with greater particularity to the drawings, the numeral 1 indicates, in its entirety, a housing including laterally-spaced parallel side walls 2, a rear wall 3, and a downwardly and forwardly-inclined top wall 4. Preferably and as shown, the open front 5 of the housing 1 is provided with a pair of vertically-spaced egg-receiving trays 6. Trays 6 divide the open front 5 into upper and lower entrances to compartments A and B respectively. The upper and lower entrances to the compartments A and B are provided with multi-sectioned curtains 7. Each of the trays 6 is provided with side members 8 which project outwardly from the side walls 2 of the housing and are rigidly secured thereto by rivets or the like as indicated at 9. Egg-receiving or collecting trays 6 are likewise provided with front walls 10 and bottom walls 11 which, as shown, extend completely through the housing 1 and are secured to the rear walls 3 thereof, as indicated at 12. As shown, the upper edges of the curtains 7 enclosing the entrance to compartment A are riveted or otherwise secured to a lip 13 depending from the top 4 while the curtains 7 enclosing the entrance to compartment B are riveted between the bottom 11 and a transverse bracing member 14, as indicated at 15. False bottom elements 16 are shown as being formed from reticulated material such as wire mesh 17 and reinforced around their generally rectangular edges, as indicated at 17a. False bottom elements 16 are provided with flanges 18 and 19 along their opposite longitudinal edges which extend in opposite directions and may be of different height whereby—by merely turning the false bottom elements 16 around the degree of pitch of the trays downwardly and forwardly from the rear wall 3 of the housing to the front walls 10 of the trays 6, may be varied—all as specifically shown by upper and lower bottom elements and compartments A and B respectively of Fig. 2.

Egg-receiving tray 6 is provided with a cover element 20, the depending side flanges or arm 21 of which are pivotally secured to the side members 8 of the tray 6 adjacent their forward ends, as indicated at 22, whereby the cover is adapted to be swung into the inoperative forward and downward position shown by the upper one thereof in Fig. 2. With the cover in this position, there is no danger of same dropping down upon the hands of the operator collecting eggs from the forward end of the egg-receiving tray 6, and the vision of the operator is completely unimpaired.

Another novel feature of my invention resides in the provision of a bar 23 rigidly secured between the free ends of a pair of bracket members or depending arms 24 pivotally secured on aligned axes at their inner ends to the intermediate portion of the side-forming members 8 of the tray 6, as indicated at 25. Formed integrally with the bracket members 24 are opposed lips or stop members 26 which overlie the cover element 20 adjacent their opposite side edges, whereby to limit downward swinging movements of the same. As shown by Figs. 1 and 2, the bar 23 may be pivotally swung from its perch-forming position immediately forwardly of the egg-receiving nest—as shown by the lower one thereof—to a barrier-forming position transversely across the open curtained front of the compartment with which it is associated, as shown by the upper one thereof. When in the lowermost perch-forming position, I have found that the same aids the hens in gaining entrance to the nest and making exit therefrom. On the other hand, when the bar 23 has been moved to the barrier-forming position, the hens are prevented from gaining entrance to the nest at such periods of time as the night-time—when it is desired to keep them roosting therein. Furthermore, the bar 23 prevents the hens in the nest from making their exit from same and consequently from walking over the eggs during periods of egg collection. It will be noted that the cover element 20 cannot be moved to its closed position until the bar 23 has been moved to its barrier-forming position. Therefore, sufficient clearance between the bracket members 24 and the side members 8 to which they are pivotally secured, must be provided to assure passage therebetween of the depending side flanges 21 of the cover element 20.

I have found in practice that one unacquainted with my novel structure sometimes attempts to lift up on the forward lip of the cover 20, in order to open same. In view of the fact that my structure is made from relatively thin sheet metal, this sometimes results in buckling of the cover. To avoid this and to point out clearly to the operator which side of the cover to lift upwardly upon, I provide the modified form of invention illustrated in Figs. 5 and 6. As there shown, the lower edge 27 of the bracket members 24 are provided with opposed ears 28 which underlie and engage the lower edge 29 of the depending flanges 21 of the cover element 20. As shown in Fig. 5, swinging movements of the bar 23 to its barrier-forming position causes the rear end of the cover 20 to be elevated by camming engagement of the opposed ears 28 with the side flanges 21.

While I have disclosed a commercial embodiment of my invention and a slight modification thereof, it is obvious that the same is capable of still further modification without departure from the spirit and scope of the invention as defined in the claims.

What I claim is:

1. A multiple egg nest including a box-like housing having laterally spaced side walls and an open front, an egg collecting tray projecting forwardly from the lower end portion of said open front, said tray including side walls, a front wall and a removable cover element, a forwardly and downwardly sloping bottom spanning the side walls of said housing and collecting tray and terminating in close proximity to the front wall of said collecting tray, a multi-section curtain normally closing said open front above said egg collecting tray, said cover element having depending arms which are pivotally secured on aligned axes to the side walls of said tray adjacent the forward end thereof for swinging movements of said cover element from a position overlying the tray to an inoperative position forwardly and downwardly thereof, a bar element, said bar element also having depending arms which are pivotally secured on aligned axes to the side walls of said tray rearwardly of the pivot axes of said cover element for swinging movements of said bar from a perch forming position immediately forwardly of said tray upwardly and rearwardly to a barrier forming position transversely of said multi-section curtain, and stop members carried by the arm associated with said bar element adapted to overlie and engage said cover element, whereby to limit downward movement of said bar element when same is swung to its perch-forming position.

2. The structure defined in claim 1 in further combination with opposed stop members carried by the arms associated with said bar element adapted to overlie and engage said cover element, whereby to limit downward movement of said bar element when same is swung to its perch forming position, and an ear on one of said arms underlying and engaging the arm associated with said cover element, whereby when swinging movements are imparted to said bar element from a perch forming position to a barrier forming position opening movements are imparted to said cover element.

References Cited in the file of this patent

UNITED STATES PATENTS

| Number | Name | Date |
| --- | --- | --- |
| 1,519,518 | Thorp et al. | Dec. 16, 1924 |
| 1,807,253 | Peterson | May 26, 1931 |
| 1,828,406 | Grill | Oct. 20, 1931 |
| 1,952,521 | Vaughan | Mar. 27, 1934 |
| 2,279,147 | Stimson | Apr. 7, 1942 |
| 2,501,475 | Muehlfeld | Mar. 21, 1950 |
| 2,584,909 | Ockenfels | Feb. 5, 1952 |